United States Patent [19]

Brysbaert et al.

[11] Patent Number: 4,803,864
[45] Date of Patent: Feb. 14, 1989

[54] REMOVABLE TUNNEL FOR MAINTAINING THE TEMPERATURE OF A PRODUCT HOT ROLLED IN A CONTINUOUS ROLLING TRAIN

[75] Inventors: Jean M. Brysbaert, Bourbourg; Alain Vautrain, Esquelbecq, both of France

[73] Assignee: Usinor Aciers, Puteaux, France

[21] Appl. No.: 123,940

[22] Filed: Nov. 23, 1987

[30] Foreign Application Priority Data

Nov. 24, 1986 [FR] France .................... 8616330

[51] Int. Cl.⁴ .................. B21B 43/00; B21B 45/02
[52] U.S. Cl. .................................. 72/202; 72/342
[58] Field of Search .............. 72/200, 202, 342, 201; 266/102, 103, 259

[56] References Cited

U.S. PATENT DOCUMENTS

| | | | |
|---|---|---|---|
| 4,343,168 | 8/1982 | Laws et al. | 72/202 X |
| 4,382,586 | 5/1983 | Reese | 266/259 |
| 4,499,746 | 2/1985 | Laws et al. | 72/202 X |
| 4,527,409 | 7/1985 | Ouwerkerk | 72/202 |
| 4,719,779 | 1/1988 | Laws et al. | 72/202 X |

FOREIGN PATENT DOCUMENTS

| | | |
|---|---|---|
| 893565 | 10/1982 | Belgium . |
| 010976 | 5/1980 | European Pat. Off. . |
| 049000 | 2/1982 | European Pat. Off. . |
| 246922 | 11/1911 | Fed. Rep. of Germany . |
| 59-06316 | 1/1984 | Japan . |
| 1023045 | 3/1966 | United Kingdom . |
| 1083586 | 9/1967 | United Kingdom . |

*Primary Examiner*—E. M. Combs
*Attorney, Agent, or Firm*—Fay, Sharpe, Beall, Fagan, Minnich & McKee

[57] ABSTRACT

The tunnel comprises a rigid metal framework (3), a U-shaped covering unit (5) and a raising means (12) for shifting the framework and the covering unit between a service position and an out of service position (3', 5'). The framework (3) includes parallel cross-members (10) and the covering unit is constituted by a smooth metal sheet covered with an insulation material. The covering unit (5) is connected under the metal framework (3) in the region of each of the cross-members (10) by a plurality of articulated suspension means (6).

11 Claims, 7 Drawing Sheets

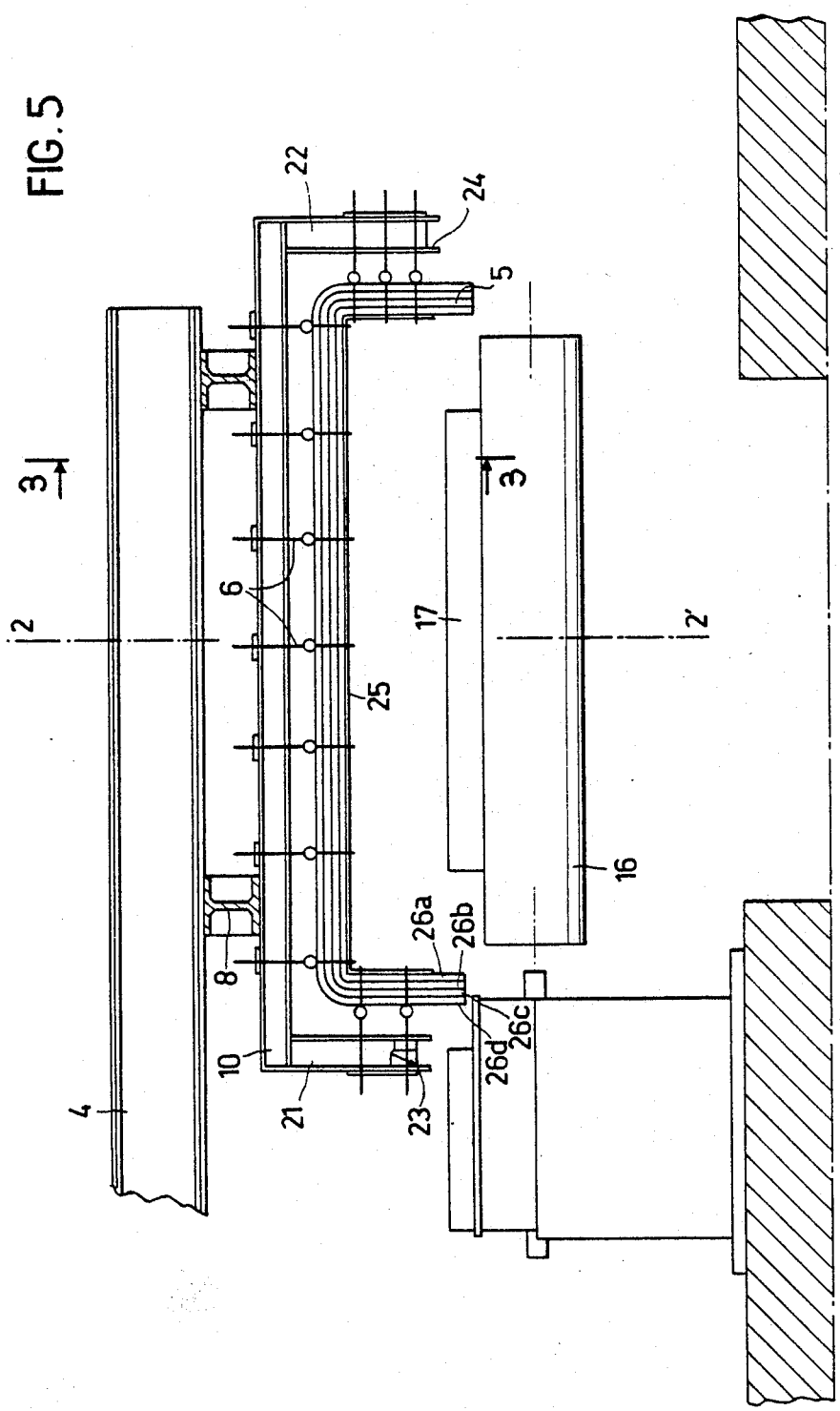

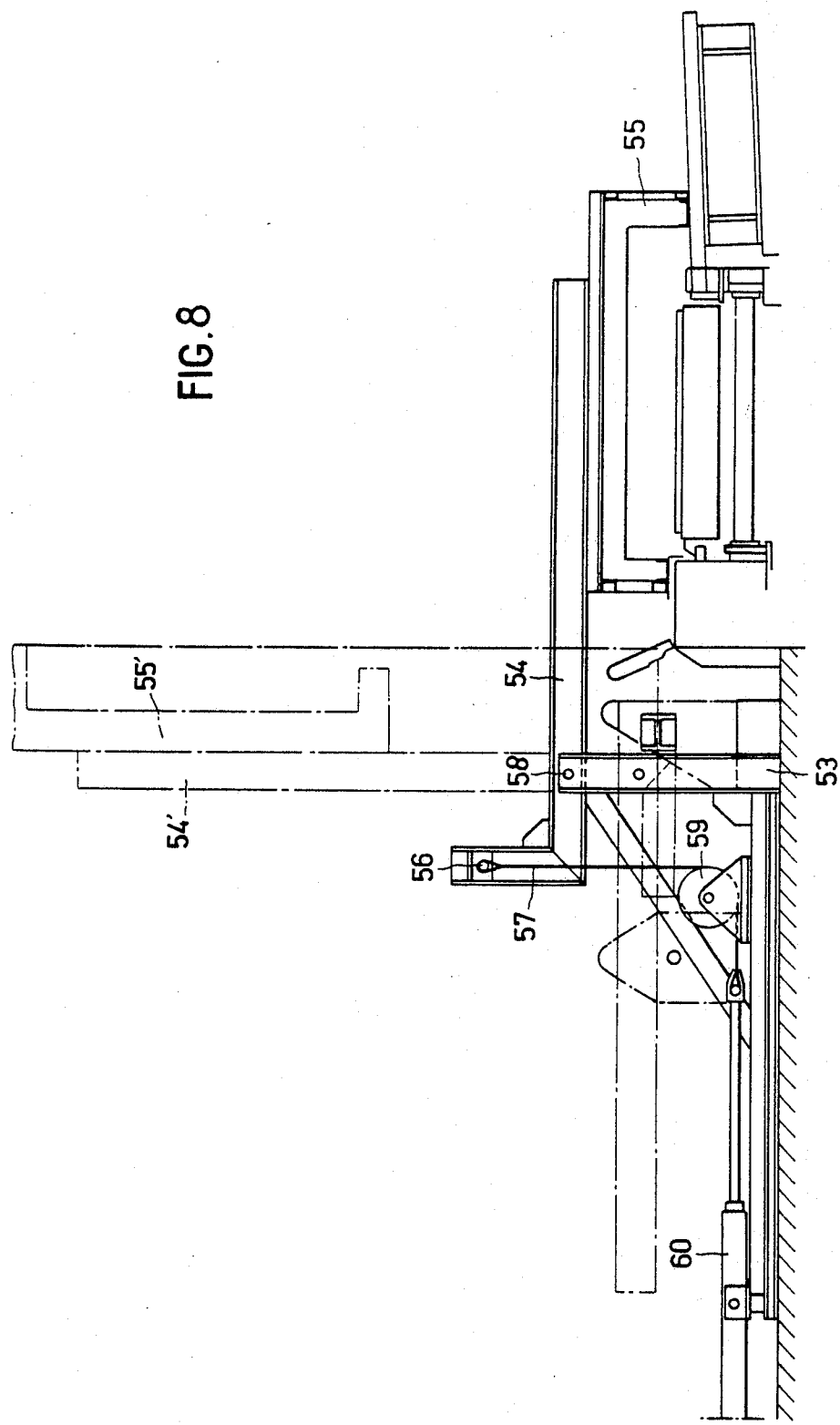

REMOVABLE TUNNEL FOR MAINTAINING THE TEMPERATURE OF A PRODUCT HOT ROLLED IN A CONTINUOUS ROLLING TRAIN

The invention relates to a removable tunnel for maintaining the temperature of a product hot rolled in a continuous rolling train.

In the exploitation of hot trains and in particular continuous strip trains, it may be desirable to control the temperature of the product in the course of rolling, in particular between two successive operations on the product separated by a period of time which is more or less long in the course of which the product travels in a waiting zone. In most of the strip trains at present in service, the strips of sheet metal are made to move on a very long transfer table after they have issued from the roughing stands and before their entry in the finishing stands, itself being preceded by a cropping effected by a shearing machine.

In the case of the rolling of certain products on these strip trains and, in particular, in the case of the rolling of oriented-grain magnetic sheets, it is necessary to carefully control the temperature of the sheet before it enters the finishing stands.

It has therefore been proposed to employ temperature maintaining tunnels covering the product during its passage on the transfer table. Such tunnels permit either the maintenance of the temperature of the strip of sheet metal substantially constant or the raising of the temperature of this sheet metal strip by the use of accessory heating means, or operation at a lower temperature in the roughing stands while maintaining a suitable temperature of the rolled product at the entrance of the finishing stands.

In all cases, the tunnel must be so mounted over the transfer table or any other part of the rolling mill where its use would be required, so that the tunnel may be withdrawn, for example, for changing from the rolling of one product range to another range which does not require the use of a temperature maintaining tunnel. It is also necessary to provide a device for very rapidly withdrawing the tunnel in the case where a very deformed leading strip end is liable to strike against the entrance of the tunnel and result in the stoppage of production and more or less serious trouble in the plant.

Temperature maintaining removable tunnels are known which are associated with hot rolling trains and comprise a rigid metal framework on which is fixed a covering unit or a hooding for the rolled product and raising means for shifting the framework and the hooding unit between a service position where the hooding covers the product over a certain length and a position in which it is out of service and spaced away from the product being rolled.

The rigid metal framework is usually constituted by a plurality of interconnected parallel cross-members which are placed in the transverse direction of the rolling mill in the service position of the tunnel. The covering or hooding unit has a U-shaped cross section which caps the rolled product in the service position. This covering device may be constituted by a simple sheet of stainless steel or aluminium bent into a U shape, by assembled plates or other elements of insulating material, or by a complex structure including a smooth metal sheet bent into a U-shape oriented toward the product and covered externally with a thermal insulation material such as rock wool.

These devices, when they are made in a simple way and at an acceptable price, are usually not very effective and have a poor life span. When it is desired to increase their effectiveness and their life, extremely costly solutions often result which are consequently of limited industrial interest.

The temperature of the covering device undergoes very large variations which result in deteriorations of this device, particularly at the points of junction with the rigid metal structure. In the case of a covering unit comprising a metal sheet externally lined with a thermal insulation material, one is consequently obliged to use a relatively thick metal sheet in order to increase the strength of the device which results in an increase in weight and cost of the removable tunnel.

Such a tunnel is usually of great length and must be made in a plurality of sections each having a rigid metal framework carrying the unit for covering the rolled product, and raising means located laterally relative to the rolling mill. The tunnel therefore constitutes a space-consuming unit involving considerable investment costs. It is therefore important to limit as far as possible the costs relating to the installation of the tunnel and to its maintenance and therefore to seek solutions whereby it is possible to prolong the life of the part of the tunnel liable to be deteriorated in service, i.e. the unit covering the rolled product.

An object of the invention is therefore to provide a removable tunnel for maintaining the temperature of a product hot rolled in a continuous rolling train, comprising at least one section extending in the longitudinal direction of the mill and constituted by a rigid metal framework formed by a plurality of interconnected parallel cross-members carrying a unit for covering the rolled product having a U-shaped cross section and constituted by a smooth metal sheet externally covered with a thermal insulation material, and raising means for shifting the framework and the covering unit between a service position, in which the covering unit is placed over the moving rolled product which it covers over a certain length, the cross-members of the framework then being placed in the transverse direction of the mill, and a position in which the covering unit is out of service and raised away from the rolled product, said removable tunnel being very effective and including a movable covering unit of low weight whose life span is considerably increased with respect to devices of the prior art.

For this purpose, the covering unit is fixed under the metal framework in the region of each of the cross-members by a plurality of suspension means articulated to the crossmember in their upper part and to the covering unit in their lower part so as to permit the covering unit to move freely relative to the rigid framework under the effect of expansions and contractions of thermal origin.

In order to explain the invention, there will now be described by way of a non-limiting example with reference to the accompanying drawings a removable tunnel according to the invention.

FIG. 5 is a view to an enlarged scale of the covering unit and corresponds to the right part of FIG. 4.

FIG. 8 is an elevational view similar to FIG. 4 of a first embodiment of the raising means of the tunnel.

FIG. 1 shows two successive sections 1 and 2 of a temperature maintaining tunnel disposed above the transfer and waiting table of a continuous strip train. The waiting table including rollers on which the strip travels is interposed between the exit of the roughing stands and the cropping shears located just in front of the finishing stands.

Figure 1:
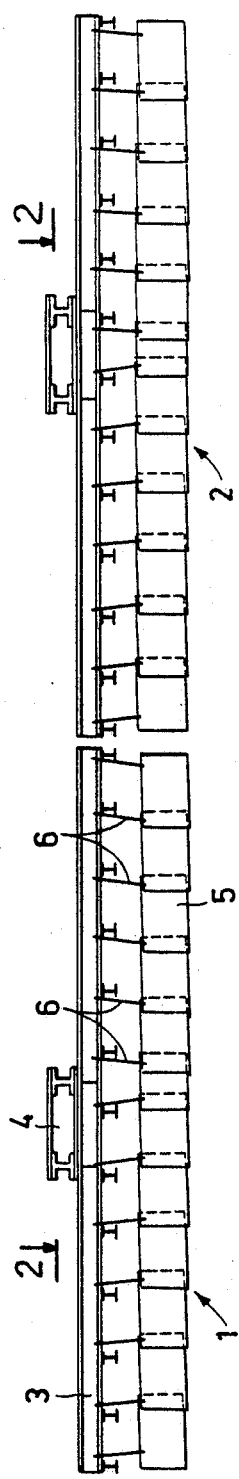
FIG. 1 is a diagrammatic side elevational and sectional view of two sections of the removable tunnel.

Each of the sections 1 and 2 has a rigid metal framework 3 fixed to the end of the arm 4 of a raising means, a covering unit 5 for the rolled sheets travelling on the waiting table, and suspension means 6 of the covering unit 5 under the rigid framework 3.

Figure 2:
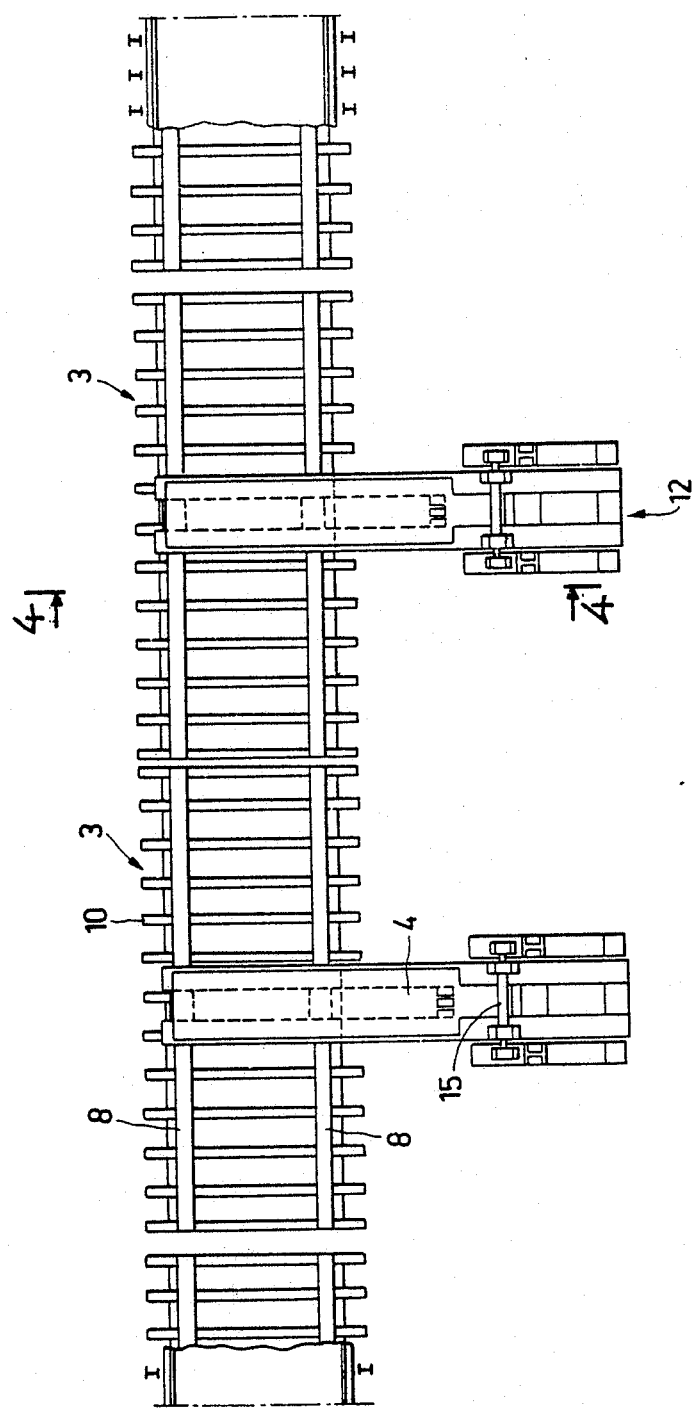
FIG. 2 is a top view taken along line 2—2 of FIG. 1.

As can be seen in FIG. 2, the rigid framework comprises, for each of the sections, two longitudinal members 8 and an assembly of cross-members 10 which are parallel to one another and rigidly secured at equal distances apart under the longitudinal members 8. The longitudinal members 8 and the cross-members 10 are I-section members. The arm 4 is constituted by two parallel I-section members rigidly fixed to the upper part of the longitudinal members 8.

Figure 4:
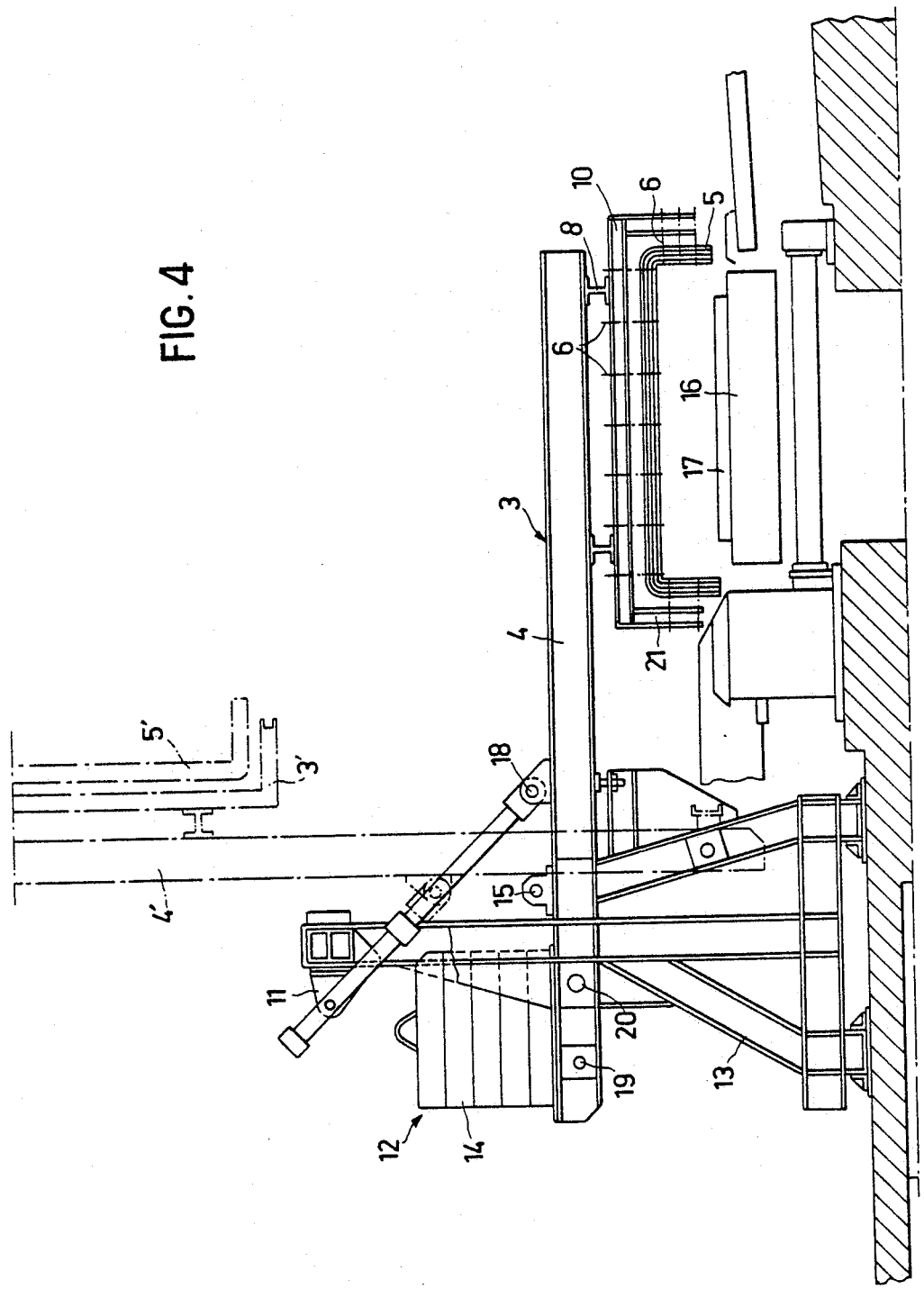
FIG. 4 is an elevational view and sectional view taken on line 4—4 of FIG. 2.

Shown in FIGS. 2 and 4 is the raising means 12 of the tunnel comprising a trestle 13 on which the arm 4 is pivotally mounted, a hydraulic jack 11 and a counterweight 14. The trestle 13 is laterally fixed relative to the waiting table of the mill, a roller 16 of which is shown in FIG. 4.

The arm 4 of the raising means is pivotally mounted on the trestle 13 by a horizontal pivot pin 15. The body of the jack 11 is fixed to the trestle 13 and its rod is articulated at its end to the arm 4 by a horizontal pin 18. The jack enables, when it is actuated, the arm 4 to be shifted between a horizontal position corresponding to the service position of the covering unit 5 of the tunnel and a vertical position 4' corresponding to the position 5' in which the covering unit 5 of the tunnel is out of service. As can be seen in FIG. 4, the covering unit 5 is placed over the sheet 17 travelling over the rollers 16 of the waiting table in the service position of the tunnel. The counterweight 14 balances the weight of the framework 3 and the covering unit 5 fixed to the end of the arm 4. The force exerted by the jack 11 for shifting the arm 4 is therefore limited to a low value.

The arm 4 includes in its end part remote from the part receiving the framework 3 and the covering unit 5, i.e., in its part on which the counterweight 14 is fixed, two apertures 19 and 20 for receiving locking pins for securing the arm in its horizontal position and its vertical position respectively, these pins engaged in the apertures 19 and 20 being received in locking recesses provided on the trestle 13.

Figure 3:
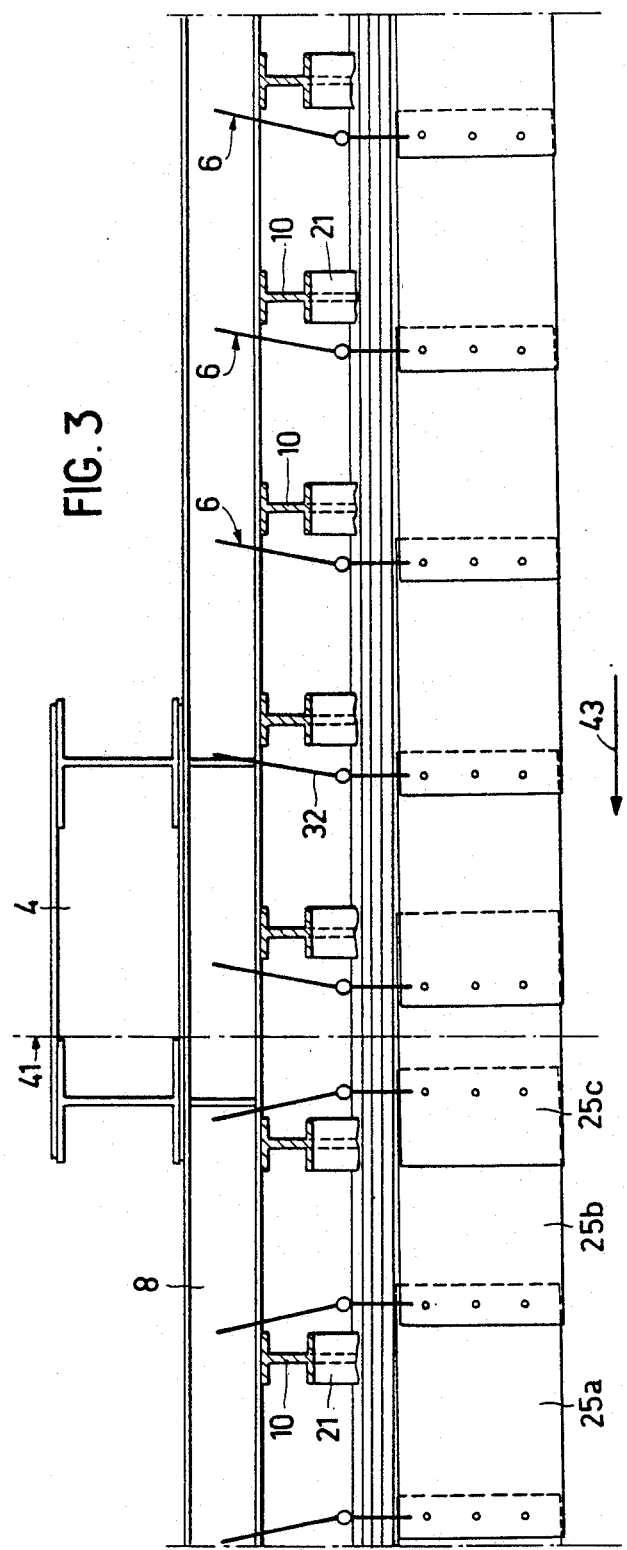
FIG. 3 is a view to an enlarged scale similar to FIG. 1 of a part of a section of the tunnel.

As be seen in FIGS. 3, 4 and 5, each of the cross-members 10 of the framework 3 has at its ends vertical extensions 21 and 22 of unequal length each constituted by two parallel metal strips welded to the end of the cross-member. All of the vertical extensions 21 and all of the vertical extensions 22 are secured at their lower ends to a section member 23 (or 24) constituting the lower part of the framework 3.

The covering unit 5 of the tunnel has a U-shaped cross section which is open in the direction away from the framework 3 on which this covering unit is fixed. This unit 5 is constituted by a sheet 25 of stainless steel 2 mm thick bent into a U-shape and covered externally throughout its surface with four superimposed layers of rock wool 26a, 26b, 26c and 26d. The smooth stainless steel sheet 25 constitutes the inner surface of the covering unit facing toward the sheet 17 being hot rolled. The four layers of rock wool thermally insulate the space defined above the rolled product 17 by the sheet 25 when the device is in its service position shown in FIG. 5. In this service position, the cross-members 10 of the framework 3 are placed in the transverse direction of the rolling mill, i.e. in the direction of the axes of the rollers 16 of the transfer table.

As can be seen in FIG. 3, the sheet 25 constituting the inner layer of a section of the covering unit is formed by a series of sheet sections bent into a U-shape 25a, 25b, 25c . . . interconnected end-to-end by screw and nut assemblies, the nut of which is welded to the sheet. The successive sections of the sheet 25 are therefore rigidly secured to one another and the assembly is equivalent to a single sheet 25 bent into a U-shape. This type of construction enables a shaped sheet 25 of great length to be obtained without difficulty.

The covering unit 5 is fixed to the framework 3 in the region of each of the cross-members 10 by a compensating assembly 6 which will be described in more detail with reference to FIGS. 6 and 7.

As can be seen in FIG. 5, each of the cross-members 10 carries seven suspension devices 6, of which one is placed substantially in the vertical median plane of the mill represented by the line ZZ' in FIG. 5 and the others, symmetrical in pairs relative to this plane. Furthermore, identical suspension means are placed between the vertical branches of the U-section of the covering unit 5 and the vertical extensions 21 and 22 of the cross-member 10 respectively. A suspension means 6 connecting the covering unit 5 to a cross-member 10 of the framework of the tunnel is shown in FIGS. 6 and 7.

The cross-member 10 carries, in the region of each of the suspension means 6, a support plate 30 welded to the upper part of the cross-member 10 and in overhanging relation so as to include a portion projecting from the cross-member 10 in the longitudinal direction of the mill. The plate 30 is provided with an opening 31 in its projecting portion and the suspension means 6 is constituted by a rod 32 extending through the opening 31. The rod 32 is screw threaded in its upper part 32a and includes a fixing hook 32b at its lower end. A swivel ball 33 bears in the opening 31 on the upper side of the plate 30 under the effect of a compression coil spring 34. The spring 34 is compressed by an assembly 35 formed by an adjusting nut, a lock-nut and a thrust washer.

The covering unit 5 of the tunnel is suspended from the hook 32b of the rod 32 through a tie bar 36 terminating in a ring 37. The tie-bar 36 includes a screw threaded lower portion engaged in an opening extending through the sheet 25 of the covering unit 5 which is fixed to the end of the tie-bar 36 by fixing means 38 formed by two nuts placed on each side of the sheet 25 and engaged on the screw threaded portion of the tie-bar 36 and by a thrust washer. The covering unit 5 is suspended from the framework 3 of the tunnel by an articulated device allowing relative displacements of the covering unit 5 constituting the hot part of the tunnel relative to the framework 3 constituting the cold part. Indeed, when the covering unit is placed in its service position over the hot rolled product 17, as shown in FIG. 5, this covering unit maintaining the temperature of the product 17 is brought to a temperature on the order of 1,000° C. The framework 3 which is protected by the layers of thermal insulation material 26a, 26b, 26c and 26d is maintained at a temperature in the neighbourhood of the ambient temperature.

The covering unit 5 constituted by a relatively thin stainless steel sheet and layers of flexible insulation material is liable to deform when it is put in suspension below the framework 3. A correct geometric U-shape is ensured owing to the adjustment of the compression of the compression springs 34 associated with the various suspension means 6. The extent of the adjustment of the springs 34 and the rods 32 is limited by a stop 39 formed by a stop washer and a nut engaged on the screw threaded portion 32a of the rod 32.

Figure 7:
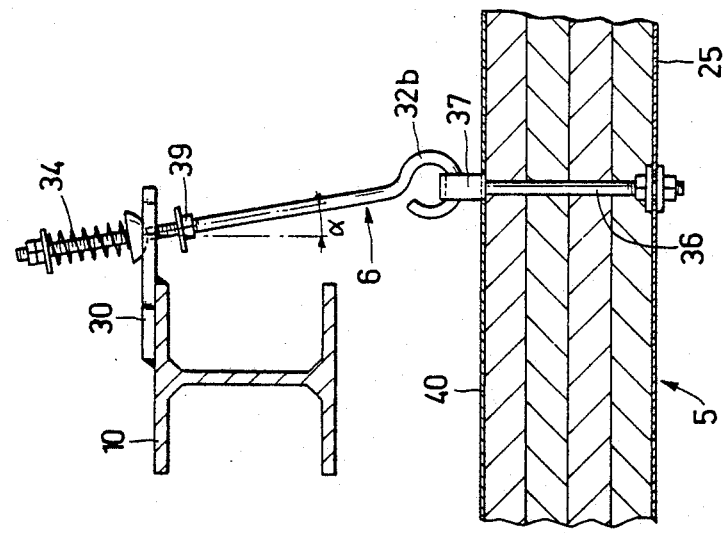
FIG. 7 is an elevational view, in the transverse direction and on line 7—7, of the suspension means shown in FIG. 6.
Figure 6:
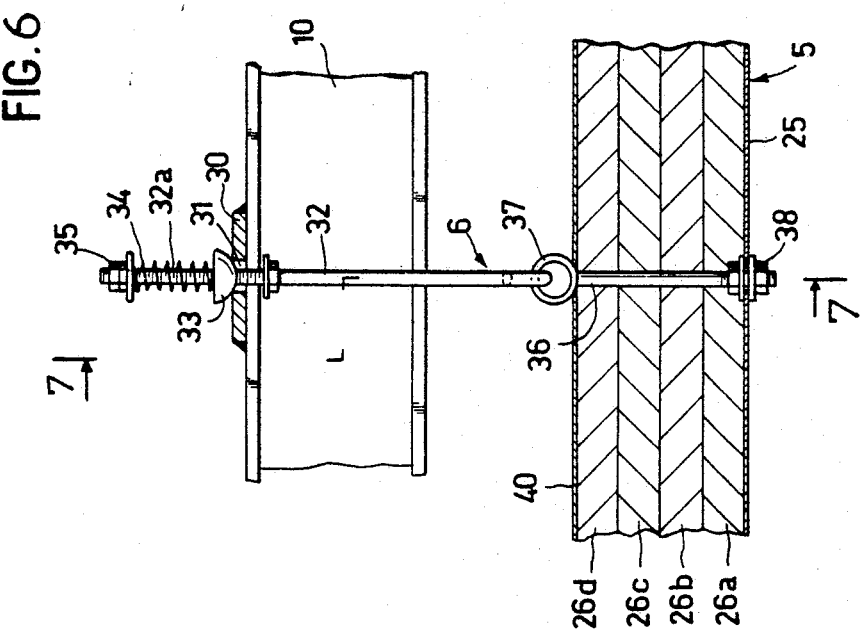
FIG. 6 is an elevational view in the longitudinal direction of a suspension means for the covering unit of the tunnel.

As can be seen in FIGS. 6 and 7, the outer layer of thermal insulation material 26d includes on its outer side a sheet of aluminium 40 which protects the whole of the thermal insulation layers fixed to the sheet 25.

As can be seen in FIGS. 3 and 7, the point at which the tie-rod 36 is fixed to the metal sheet 25 of the covering unit 5 is not in vertical alignment with the opening 31 of the plate 30 on which the ball 33 engaged on the rod 32 bears. Consequently, the tie-rod 32 is inclined at an angle to the vertical in a vertical plane parallel to the axis of the rolling mill.

FIG. 3 shows, in respect of the corresponding tunnel section, the line 41 of the plane of symmetry of this transverse section. The suspension means 6 are placed, in the longitudinal direction of the mill, symmetrically relative to this plane 41. Furthermore, the rods 32 of the suspension means 6 located on one side of the median plane 41 are all inclined at the same angle αin the direction of the entrance of the tunnel section, the hot rolled product travelling in the direction of arrow 43 on the transfer table. The rods 32 of the suspension means 6 located on the other side of the median plane, i.e. adjacent to the exit of the tunnel section, are inclined at an angle αtoward the exit of the tunnel section.

The contrary inclination of the rods 32 of the suspension means 6 enables the sections of the covering unit 5 to be self-centered relative to the framework 3 of the tunnel. On the other hand, in each of the sections, the thermal flow due to the hot product 17 and the resulting linear expansion of the sheet 25 of the covering unit is propagated from the median plane 41 to the ends of the tunnel. The inclination of the rods 32 and their articulated assembly at both their ends permit the best possible absorption of the expansions of the sheet of the covering unit giving rise to only small stresses, in particular at the anchoring points.

When starting up an operation for maintaining the temperature, when the covering or hooding part of the tunnel is placed in its service position and is subjected to the first thermal shocks resulting from the presence of the hot rolled product, the stainless steel sheet 25 droops between the suspension devices 6 and forms an alveolate assembly in which the rock wool of the layers 26a to 26d comes to be disposed owing to its flexibility, which achieves the self-locking of this rock wool.

In the case of a temperature maintaining tunnel of hot rolled metal sheet disposed above the transfer table between the exit of the roughing stands and the cropping shears at the entrance of the finishing stands, a tunnel having a total length in the neighbourhood of 40 meters is used which has six successive sections each associated with a raising and withdrawing means. The covering or hooding unit for the product is formed by a sheet of refractory steel bent into a U-shape and having no stiffener. The inner surface of the hooding is therefore completely subjected to the direct radiation of the hot rolled sheet strip. This simple shape of the refractory steel sheet bent into a U-shape also avoids the risk of twisting under the effect of the increase in temperature.

The outer insulating layers of the hooding are formed by three superimposed sheets of rock wool having a thickness of 25.4 mm and by a sheet of rock wool also having a thickness of 25.4 mm but externally covered with a sheet of aluminium. The sheets of rock wool are disposed in crossed layers and maintained by fasteners bolted to the refractory steel sheet. The rods 36 of the suspension of the hooding are so disposed as to pass between the crossed layers of rock wool.

The temperature maintaining tunnel having the characteristics given above was used on a hot strip rolling train, in particular for the production of oriented-grain magnetic sheets. In the course of use over a long period, this tunnel underwent no deterioration and its life span would seem to be much greater than that of known devices of the prior art.

Furthermore, the performances of this tunnel from the thermal point of view have been found to be at least equivalent to those of the most perfected devices of the prior art.

FIG. 8 shows a embodiment of a raising means associated with a section of a temperature maintaining tunnel according to the invention. The arm 54 of this raising means carrying at one of its ends the unit 55 formed by the framework and the hooding of the tunnel section has been shown in its horizontal service position and in its out of service vertical position. The end of the arm 54 opposed to the unit 55 is bent at 90° and carries a journal 56 on which the end of a cable 57 is fixed. The arm 54 is pivotally mounted by a horizontal pin 58 on a fixed support device. The cable 57 extends around a pulley 59 which directs its end portion opposed to the journal 56 of the arm 54 in the horizontal direction.

This end portion is connected to the rod of a jack 60 disposed horizontally on the fixed support 53. The actuation of the jack 60 shifts the arm 54 between its service position and its out of service position 54'. The connection by means of the cable 57 affords an increased flexibility for the transmission of the movement to the arm 54 and an arrangement of the jack in a horizontal position in the lower part of the fixed support 53.

Figure 9:
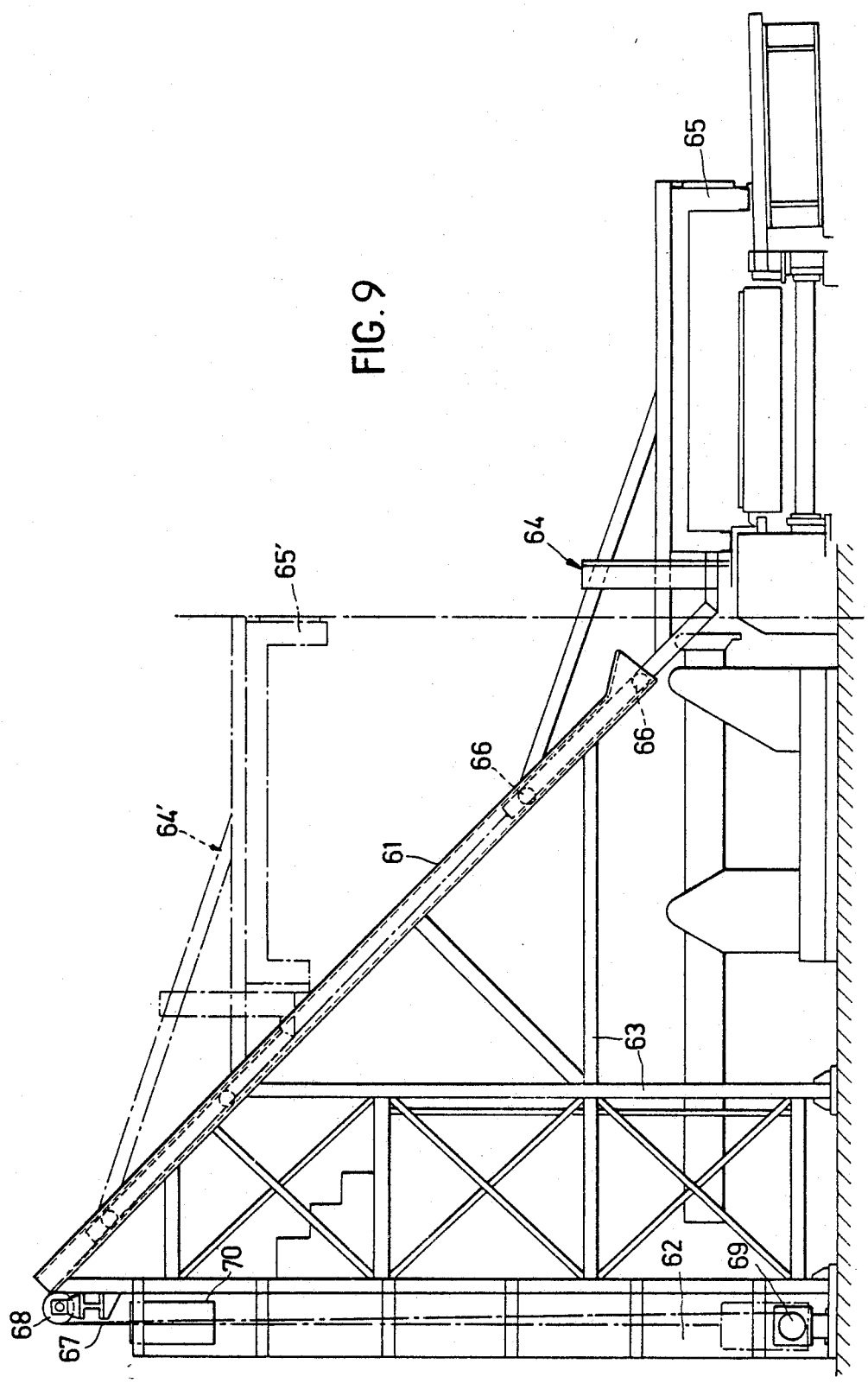
FIG. 9 is an elevational view, similar to FIGS. 4 and 8, of a second embodiment of the raising means of the tunnel.

FIG. 9 shows another embodiment of a raising device for a tunnel according to the invention. The device comprises a fixed support 63 disposed in a lateral position relative to the transfer table of the rolling mill and carrying two parallel inclined rails 61. The unit 65 including the framework and the hooding of the tunnel is fixed to a carriage 64 which has been shown in its position corresponding to the service position of the unit 65 and in a raised position 64' corresponding to an out of service position 65' of the unit 65. The carriage 64 is provided with four rollers such as 66 which are guided during the movements of the carriage by the rails 61.

The carriage 64 is fixed to a cable 67 passing around a guide pulley 68 in the upper part of the raising device. The end portion of the cable remote from its portion connected to the carriage 64 is wound around a pulley block 69 for shifting the carriage between its service position and raised position 64'. A counterweight unit 70 balances the weight of the carriage 64 and the unit 65. After having passed around the pulley 68, the cable 67 extends substantially vertically within a passageway provided in the fixed support 63.

The advantage of the raising device shown in FIG. 9 is its great reliability in use and the fact that the unit 65 undergoes no rotation during its displacement and remains constantly oriented in the same way as in its service position. The layers of rock fibre which externally cover the hooding therefore undergo no stresses under the effect of their weight tending to shift them and therefore have an improved behaviour when shifting the tunnel.

In any case, the tunnel according to the invention has the advantnage of an improved life span of its covering unit which is mounted in a freely articulated manner on the rigid framework connected to the raising means.

The scope of the invention is not intended to be limited to the described embodiments.

Thus, other embodiments of the suspension means may be imagined which constitute expansion compensators for the covering unit of the tunnel, it being possible for the suspension means to employ, for their connection to the framework and to the covering unit, any mechanical articulation arrangement.

It will also be clear that other embodiments of the raising means of the covering unit of the tunnel may be imagined.

Lastly, the temperature maintaining tunnel according to the invention may be used in any plant for continuously hot rolling products whose temperature must be controlled in the course of a transfer through a relatively great length.

What is claimed is:

1. A removable tunnel for maintaining the temperature of a product hot rolled in a continuous rolling train, comprising at least one section extending in a longitudinal direction of the rolling mill and including a rigid metal framework having a plurality of interconnected cross-members, a covering unit for the rolled product having a U-shaped cross section and constituted by a smooth metal sheet having an outer side, a thermal insulation material placed on said outer side of the metal sheet, and a raising means for shifting the framework and the covering unit between a service position, in which the covering unit is placed over the moving rolled product which it covers over a given length, the cross-members of the framework extending transversely of the mill, and an out of service position in which the covering unit is raised away from the rolled product, and means for suspending the covering unit under the metal framework in the region of each of the crossmembers comprising a plurality of pivotable link means connected to the cross-member at one end thereof and to the covering unit at an opposite end thereof so as to allow the covering unit to pivot freely relative to the rigid framework under the effect of thermal expansions and contractions of said covering unit.

2. A tunnel according to claim 1, each of said pivotable link means comprises a rod carrying at one end thereof a swivel ball, an opening in the framework in which the swivel ball is engaged, a hook carried at an opposite end of the rod, and a suspension ring carried by the covering unit and hookingly engaged on said hook.

3. A tunnel according to claim 2, comprising a compression spring having one end bearing against said ball and a compression-adjusting device connected to the rod and in abutment with an end of the spring opposed to said one end thereof.

4. A tunnel according to claim 3, wherein the spring compression-adjusting device comprises at least one nut and a thrust washer.

5. A tunnel according to claim 2, comprising a tie-rod having an end rigidly fixed to the smooth metal sheet of the covering unit and an opposite end fixed to said suspension ring of the covering unit.

6. A tunnel according to claim 2, wherein the rods of the pivotable link means are inclined to the vertical in the service position of the covering unit.

7. A tunnel according to claim 6, wherein, for each section of the tunnel, rods of the pivotable link means located on one side of a transverse median plane of the section are inclined at a same angle α to the vertical in a vertical plane parallel to the axis of the rolling mill, and rods of the pivotable link means located on an opposite side of said median plane of the section are inclined at a same angle α to the vertical in an opposite direction in a vertical plane parallel to the axis of the rolling mill.

8. A tunnel according to claim 1, wherein the raising means for the framework and the covering unit comprises a fixed trestle, an arm mounted on the trestle to pivot about a horizontal pin and a jack having a body fixed to the trestle and a rod connected to the arm to pivot about a horizontal pin.

9. A tunnel according to claim 1, wherein the raising means for the framework and the covering unit comprises a fixed support, an arm mounted on the support to pivot about a horizontal pin and having an end carrying the framework of the covering unit, a cable having one end fixed to an end of the arm remote from the framework and the covering unit, a guiding pulley on which the cable is guided and a jack having a body fixed to the support and a rod connected to an end of the cable opposed to said the one end of the cable.

10. A tunnel according to claim 1, wherein the raising means for the framework and the covering unit comprises a fixed support, an inclined member connected to the fixed support, a carriage movably mounted on the inclined member, means for shifting the carriage, framework, and covering unit along the inclined member between a position corresponding to the service position of the covering unit and an out of service position of the covering unit.

11. A tunnel according to claim 10, wherein said means for shifting the carriage along the inclined member comprises a cable having one end fixed to one end of said carriage and an opposite end fixed to a pulley block for pulling the cable and shifting the carriage.

* * * * *